United States Patent [19]

LaFreniere

[11] Patent Number: 5,133,867
[45] Date of Patent: Jul. 28, 1992

[54] REVERSE OSMOSIS PROCESS FOR RECOVERY OF $C_3$-$C_6$ ALIPHATIC HYDROCARBON FROM OIL

[75] Inventor: Lucie Y. LaFreniere, Brights Grove, Canada

[73] Assignee: Exxon Research and Engineering Company, Florham Park, N.J.

[21] Appl. No.: 722,467

[22] Filed: Jun. 27, 1991

Related U.S. Application Data

[63] Continuation-in-part of Ser. No. 607,332, Oct. 31, 1990, abandoned.

[51] Int. Cl.$^5$ ............................................... B01D 61/00
[52] U.S. Cl. ............................... 210/651; 210/652; 210/653; 210/654
[58] Field of Search ............... 210/652, 651, 653, 654, 210/650, 500.2, 500.29

[56] References Cited

U.S. PATENT DOCUMENTS

| | | | |
|---|---|---|---|
| 2,947,687 | 10/1954 | Lee | 210/650 |
| 3,173,867 | 3/1965 | Michaels | 210/321.74 |
| 3,179,632 | 4/1965 | Hendrix | 260/78 |
| 3,179,633 | 4/1965 | Endrey | 260/78 |
| 3,228,876 | 1/1966 | Mahon | 210/321.78 |
| 3,367,504 | 2/1968 | Westmoreland | 210/321.74 |
| 3,386,583 | 6/1968 | Merten | 210/321.74 |
| 3,397,750 | 8/1968 | Newby et al. | 210/321.78 |
| 3,417,870 | 12/1968 | Bray | 210/321.74 |
| 3,546,175 | 12/1970 | Angelo | 260/65 |
| 3,708,458 | 1/1973 | Alberino et al. | 528/67 |
| 3,789,079 | 1/1974 | Perry et al. | 585/818 |
| 3,816,303 | 6/1974 | Wrasidlo | 210/654 |
| 3,822,202 | 7/1974 | Hoehm | 210/500.39 |
| 3,853,754 | 12/1974 | Gosser | 502/152 |
| 3,925,211 | 12/1975 | Schumann et al. | 210/500.28 |
| 4,113,628 | 9/1978 | Alegranti | 210/500.28 |
| 4,240,914 | 12/1980 | Iwama et al. | 210/500.23 |
| 4,307,135 | 12/1981 | Fox | 427/244 |
| 4,368,112 | 1/1983 | Thompson et al. | 210/500.29 |
| 4,532,041 | 7/1985 | Shuey et al. | 210/500.2 |
| 4,532,041 | 7/1985 | Shuey et al. | 210/500.39 |
| 4,595,507 | 6/1986 | Chang et al. | 210/638 |
| 4,617,126 | 10/1986 | Funk et al. | 210/651 |
| 4,670,151 | 6/1987 | Bitter | 210/641 |
| 4,715,960 | 12/1987 | Thompson | 210/651 |
| 4,750,990 | 6/1988 | Kulkarni et al. | 208/251 R |
| 4,816,140 | 3/1989 | Trambouze et al. | 208/309 |
| 4,978,454 | 12/1990 | Sweet | 210/650 |

FOREIGN PATENT DOCUMENTS 1434639 5/1976 United Kingdom .

OTHER PUBLICATIONS

"New Polyimide Ultrafiltration Membranes For Organic Use" Iwama et al., J. Memb. Sci 11 (1982) 297-309.

"Asymmetric Polyimide Membranes For Ultrafiltration of Non-Aqueous Solutions" Strathmann, Desalination 26(1978) 85-91.

"Hydrocarbon Separations With Polymeric Membranes" Kulkarni et al., AIChE Symposium Series, Recent Advances in Separation Techniques-III No. 250 vol. 82, pp. 78-84. No Date Shown.

*Primary Examiner*—Robert A. Dawson
*Assistant Examiner*—Ana M. Fortuna
*Attorney, Agent, or Firm*—Joseph J. Allocca

[57] ABSTRACT

Solvents comprising $C_3$, $C_4$, $C_5$ and $C_6$ aliphatic hydrocarbons (i.e. propane, propylene, butane, butylene, pentane, cyclopentane, pentene, hexane, cyclohexane, hexene and their isomers) and mixtures thereof, preferably $C_3$ and $C_4$ hydrocarbons and mixtures thereof are recovered from hydrocarbon oils in the liquid phase by the reverse osmosis permeation of said solvent through a polyimide reverse osmosis membrane at low temperature.

9 Claims, No Drawings

REVERSE OSMOSIS PROCESS FOR RECOVERY OF $C_3$-$C_6$ ALIPHATIC HYDROCARBON FROM OIL

This application is a continuation in part of application U.S. Ser. No. 07/607,332, filed Oct. 31, 1990, now abandoned.

DESCRIPTION OF THE INVENTION

Solvents comprising $C_3$, $C_4$, $C_5$ and $C_6$ aliphatic hydrocarbons (i.e. propane, propylene, butane, butylene, pentane, cyclopentane, pentene, hexane, cyclohexane, hexene and their isomers) and mixtures thereof, preferably $C_3$ and $C_4$ hydrocarbons and mixtures thereof are recovered from hydrocarbon oils in the liquid phase by the reverse osmosis permeation of said solvent through a polyimide reverse osmosis membrane at low temperature.

BACKGROUND OF THE INVENTION

Solvents such as propane, butane, propene, butene and mixtures thereof are usually recovered for reuse by processes whereby the solvent is permitted to vaporize to thereby become separated from the dewaxed oil and this recovered vapor is then subjected to high energy compression to be reliquified for reuse. It is subsequently cooled to the low temperature required for dewaxing. While this results in the recovery of substantially pure solvent, it is extremely energy intensive and not very economical.

Less energy intensive systems have been investigated for the recovery of these light hydrocarbon autorefrigerative dewaxing solvents.

In U.S. Pat. No. 4,595,507 it is taught that mixtures of heavy oils and light hydrocarbons may be separated by passing the mixture through a polymeric membrane. The membrane used comprises a polymer which is capable of maintaining its integrity in the presence of hydrocarbon compounds and which has been modified by being subjected to the action of a sulfonating agent. Sulfonating agents include fuming sulfuric acid, chlorosulfonic acid, sulfur trioxide, etc. The surface or bulk modified polymer will contain a degree of sulfonation ranging from about 15 to about 50%. The separation process is effected at temperatures ranging from about ambient to about 100° C. and pressures ranging from about 50 to 1000 psig. The process is described as useful for separating heavy oils from relatively light hydrocarbons which have been used as solvents in the various hydrocarbon treatment processes. The light hydrocarbon is recovered as the permeate. The membrane used may possess a wide range of pore sizes ranging from about 10 to about 500 Angstroms. The membranes are made from polymers which have solubility factors sufficiently different from those of the light hydrocarbon solvents in order to avoid dissolution of the membrane in the solvent. The membranes are made from polymers having solubility parameters in excess of about 9.0. Membranes which can be useful include those made from polysulfone, polycarbonate, cellulose acetate, poly-acrylonitrile, polyvinylalcohol, Nylon 6,6, Nylon 8, cellulose, polybenzemidazole, polyamide, polyimide, polytetrafluoroethylene.

U.S. Pat. No. 4,617,126 teaches that mixtures of heavy oil and light hydrocarbons may be separated by passing the mixture over a polymeric membrane which comprises a polymer capable of maintaining its integrity in the presence of hydrocarbon compounds at temperatures ranging from about ambient to about 100° C. and pressures ranging from about 50 to 1000 psi. The membranes possess pore sizes ranging from about 10 to about 500 Angstroms and are cast from a solution.

The membrane is made from polymeric material which, having a different solubility parameter than the light hydrocarbon, does not dissolve in the light hydrocarbon. The polymers possess solubility parameters in excess of 9.0 and include polysulfone, polycarbonate, cellulose acetate, polyacrylonitrile, polyvinyl alcohol, Nylon 6,6, Nylon 8, cellulose, polybenzoimidazole, polyamide, polyimide, polytetrafluoroethylene.

The solvents recovered can include ethanol, propanol, butanol, propane, n-pentane, iso-pentane, n-hexane, n-heptane. The membranes are prepared by dissolving the polymer in a casting solvent to produce a casting solution. The casting solvents include N-methyl 2-pyrollidone, dimethylformamide, dimethylsulfoxide, dichloromethane, dichloroethane, chloroform, methyl cellusolve, propylene glycol or mixtures thereof such as DMF/methyl cellusolve, NMP/propylene glycol, NMP/DMSO etc.

THE PRESENT INVENTION

It has been discovered that solvents selected from the group consisting of $C_3$, $C_4$, $C_5$ and $C_6$ aliphatic alkane and alkene hydrocarbons and mixtures thereof, (i.e. propane, propene, butane, butene, pentane, cyclopentane, pentene, hexane, cyclohexane, hexene and their isomers) preferably $C_3$ and $C_4$ hydrocarbons and mixtures thereof, most preferably propane and butane and mixtures thereof can be separated from oil by the selective permeation of said solvent in the liquid phase through a membrane under reverse osmosis conditions, said separation being conducted at a temperature below ambient temperature, i.e., usually about 20° C. and lower, preferably about 0° C. and lower, more preferably about −10° C. and lower. The lower limit of temperature is that at which the oil and solvent are either too viscous to permeate at the applied pressure or at which any residual wax precipitates out of the oil, i.e. the cloud point of the dewaxed oil.

The reverse osmosis membrane used to practice this process possesses a pore size preferably in the range 0.001 to 0.0001 μm, and is preferably asymmetric in nature. By asymmetric is meant a membrane possessing a thin, dense film of polymer on an integral, porous backing of the same polymer.

Alternatively, the thin, dense film of polymer can be deposited on a different porous backing material to produce a composite membrane which is also suitable for use in the reverse osmosis process of the present invention.

The membrane can be selected from the group consisting of polysulfone, polycarbonate, cellulose acetate, polyacrylonitrile, polyvinyl alcohol, nylon 6,6, nylon 8, cellulose, polybenzoimidazole, polyamide, polyimide, polytetrafluoroethylene, and is preferably polyimide. The reverse osmosis process is practiced at an apparent pressure differential of between about 50 to 1500 psi, preferably between about 200 to 1000 psi, most preferably between about 400 to 1000 psi. A pressure is applied on the permeate side of the membrane to keep the permeate as a liquid. That permeate pressure is lower than the feed pressure and is at least equal to the vapor pressure of the solvent at the operating temperature.

In $C_3$-$C_6$ aliphatic dewaxing solvent-dewaxed oil solutions there are no noticeable polarity differences between the constituents to effect the reverse osmosis separation. Consequently, the separation must be effected on the basis of size differences between the dewaxing solvent and the dewaxed oil from which the adequate pore size at the membrane surface is critical. Because of the close similarity in molecular diameter between the dewaxing solvent and the dewaxed oil the pore size of the successful membrane will be limited to a narrow range. Further, although pore size is critical in effecting the separation the overall porous structure of the membrane is important in controlling the permeation rate.

The process of the present invention preferably recovers $C_3$ to $C_6$ aliphatic dewaxing solvents from dewaxed oils. The dewaxed oils from which the dewaxing solvents are recovered cover a broad range of weights and grades, ranging from light oil distillates in the 60N range to Bright Stocks and heavier. Light oils such as the 60N have flash points by the Cleveland open cup ASTM D92 method of about 165° C. while the heavier oils such as Bright Stock have flash points of about 330° C. and higher.

The dewaxed oils can be obtained from any natural or synthetic source. Thus, distillates and hydrocracked oils can be dewaxed as can the isomerates obtained by the isomerization of wax into oil. Similarly oils obtained from tar sands and coal liquefaction can be dewaxed and the hydrocarbon dewaxing solvents used can be recovered by the present process.

As previously stated, the membrane of choice in the present invention is a polyimide membrane.

Polyimide membranes can be produced from a number of polyimide polymer sources. The identity of such polymers, the fabrication of membranes therefrom, and the use of such membranes to effect various types of separations are presented in numerous patents. See, for example, U.S. Pat. No. 4,307,135, U.S. Pat. No. 3,708,458, U.S. Pat. No. 3,789,079, U.S. Pat. No. 3,546,175, U.S. Pat. No. 3,179,632, U.S. Pat. No. 3,179,633, U.S. Pat. No. 3,925,211, U.S. Pat. No. 4,113,628, U.S. Pat. No. 3,816,303, U.S. Pat. No. 4,240,914, U.S. Pat. No. 3,822,202, U.S. Pat. No. 3,853,754, G.B. Pat. No. 1,434,629.

In U.S. Pat. No. 4,532,041 a process for producing an asymmetric polyimide polymer membrane from an undegraded fully imidized, highly aromatic polyimide copolymer, and the use of such membrane for the separation of mixtures of organic liquids is described.

The membrane described therein is one of the preferred membranes for use in the present process.

The polyimide polymer is an aromatic, fully imidized, and highly polar copolymer. The polyimide polymers described in U.S. Pat. No. 3,708,458 assigned to Upjohn are the preferred polyimide polymers used in the present invention. The polymer is a copolymer derived from the co-condensation of benzophenone 3,3',4,4'-tetracarboxylic acid dianhydride (BTDA) and a mixture of di(4aminohenyl)methane and toluene diamine or the corresponding diisocyanates, 4,4'-methylenebis(phenyl isocyanate) and toluene diisocyanate.

The obtained copolyimide has imide linkages which may be represented by the structural formulae:

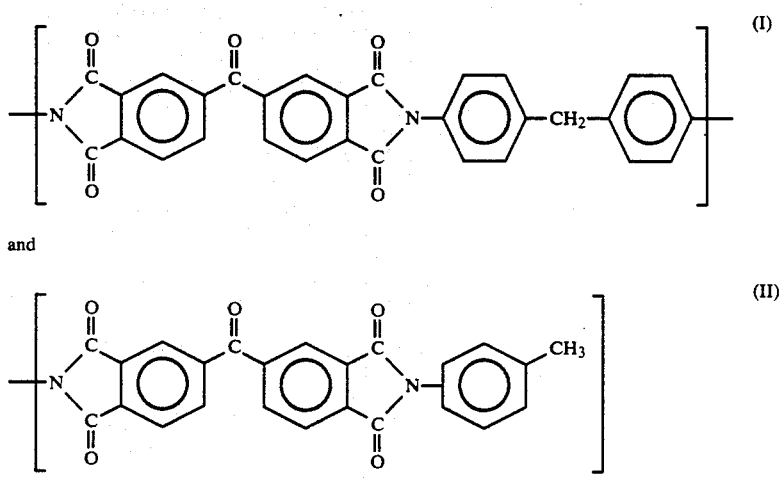

and wherein the copolymer comprises from about 10 to 90% I and 90 to 10% II, preferably about 20% I and about 80% II. Polymer preparation is described in U.S. Pat. No. 3,708,458.

In U.S. Pat. No. 4,532,041 it is taught that in order to produce a membrane possessing high flux, high selectivity (in a reproducible and consistent manner) which is also highly durable and flexible, the polyimide starting material out of which the membrane is cast must be in a non degraded form. As used in this specification the descriptive phrases "non degraded form" or "undegraded" means that the polyimide copolymer has been precipitated from its synthesis solution using a non aqueous solvent, or if isolated from its solution using water or an aqueous solvent, it must have been recovered from the water or aqueous solvent as quickly as possible to insure minimum polymer deterioration. To this end the best commercial sources of polyimide copolymer satisfying this requirement of the present invention was Upjohn Company's 2080D, which was an about 22% solution of the polymer in N,N-dimethylformamide (DMF) solvent and 2080 DHV which was an about 25% solution of the polymer in DMF solvent. These solutions were the polymerization reaction product solutions without further processing and were sold by Upjohn Company as such. The polymer as a 25% solution of polymer in DMF is now available from Lenzing (Austria) as Lenzing P84. The polyimide copolymer in solution is recovered for use in the membrane preparation procedure by precipitation from the DMF solvent using an anti-solvent which is non aqueous and a non-solvent for the polymer, but which is misoible with DMF, e.q. methanol, acetone, MEK, toluene, preferably acetone. The polymer is redissolved in the appropriate pro-solvent/anti-solvent pair at the desired solvent ratio and polymer loading level to give a casting solution suitable for the production of membranes.

Thus, for example, one liter of polymer solution (e.g. Upjohn 2080 DHV) is transferred to a blender and three successive 300 ml portions of acetone are added with 5 min. mixing at low speed between each addition. Subsequently, the blender contents are emptied into a container and permitted to settle. The liquid is decanted and 1.5 liters of acetone added and the mixture stirred thoroughly. The mixture is filtered through a coarse filter (Whatman #4). The polymer is washed by remixing with another 2 liters of acetone. After filtering, the polymer is dried in L vacuum (15 inches Hg) at 45°-60° C. for 3 hours. The polymer powder is ready for use.

The pro-solvent can be any solvent which is a good solvent for the polyimide polymer, but is preferably selected from the group dimethylsulfoxide (DMSO), N,N-dimethylformamide (DMF), N,N-dimethylacetamide (DMAC) and N-methylpyrrolidone (NMP) and mixtures thereof. DMF is preferred.

The anti-solvent can be any solvent in which the polymer is insoluble but compatible. Typical of such anti-solvents are simply organic solvents such as alcohols, ketones, ethers and esters. Methyl alcohol, acetone, dioxane, morpholine, sulfolane, $\gamma$-butyrolactone and ethyl acetate are examples of anti-solvents. Dioxane is preferred.

It is preferred that the solvents used in this membrane casting process be free of water. Even as little as 0.2 wt. % water in the solvent can be detrimental to the performance of the membrane.

A suitable membrane can be cast from this polymer using a casting solution comprising about 14-30 weight percent preferably about 16-25 weight percent, more preferably 18-22 weight percent polymer in dioxane:DMF solvent (1:1 to 10:1 D/DMF, preferably about 7:1 to 3:1). This solution is spread on a moving casting belt at a casting speed of about 3-5 ft/min. and the film allowed to partially evaporate in dry air, preferably for about 2-120 seconds, more preferably about 2-30 seconds, before gelation in a gelation bath, which is preferably water (neutral pH). The gelation water is preferably replaced with glycerin to retard membrane deterioration (hydrolysis).

In practicing this upgrading permeation process, the membrane can be employed as an element in any convenient form. Membranes in the form of tubes or fibers can be bundled, potted and manifolded, much in the manner described in U.S. Pat. No. 3,228,877. Similarly, membranes in the form of sheets can be employed in plate and frame configuration or in the form of spiral wound elements some designs of which are in U.S. Pat. Nos. 3,417,870, 3,173,867, 3,367,504, 3,386,583, 3,397,790 to list just a few. The choice of glues and materials of construction will depend on the kind of solvent and feed stream as well as operating conditions. Typical adhesives and glues will include those listed in U.S. Pat. No. 4,464,494 and U.S. Pat. No. 4,582,726.

The spiral wound element will typically comprise layers of membrane wound around a central tube (metal or solvent resistant plastic) containing holes for the permeate, the membrane layers being separated by alternate layers of a permeate carrier, such as knitted Simplex (Dacron, with melamine formaldehyde stiffener), and a feed spacer made of Vexar (a polypropylene mesh). Membrane layers are typically sealed using an epoxy adhesive to sandwich the permeate cloth into a closed envelope in fluid communication with the perforated central tube leaving the perforations in the central tube as the only permeate outlet.

In the following examples, except where otherwise indicated the polyimide membrane was made in the following manner.

The membrane was prepared from a casting dope with 18 wt % polymer concentration in a 2:1 (v/v) dioxane/DMF solvent mixture using a 10 mil casting knife, a 10 second evaporation time and a 4° C. water quench bath. The polyimide polymer used was supplied by Lenzing (Austria) under the trade designation P84. Before use the membrane was pretreated by a solvent exchange soak in: water-isopropanol, isopropanol, isopropanol-hexane. As a final step the membrane was pressure permeated with hexane at about 100 psig.

EXAMPLE 1

A feed composed of 20 LV % Bright Stock deasphalted oil in propane was compared to a feed composed of Bright Stock deasphalted/dewaxed oil in propane. The operating pressure was 950 and 350 psig respectively on the feed and permeate sides. Temperature was 60° C. The purpose of the example is to show the effect of wax in oil on the performance of the polyimide membrane. The results showed the same oil rejection but a higher permeation rate with the dewaxed oil.

| Bright Stock Oil | % Oil Rejection | Permeation Rate l/m² day |
|---|---|---|
| Deasphalted | 63 | 550 |
| Deasphalted, Dewaxed | 67 | 1100 |

EXAMPLE 2

This example shows the polyimide membrane to be the most promising amongst several commercial membranes and other laboratory prepared membranes. The tests were using feed composed of 8 LV % 600N dewaxed oil at 60° C. The transmembrane pressures varied.

The results are shown in Table 1 attached. The polysulfone (PSF) membrane was the type used in U.S. Pat. No. 4,595,507 for recovery of pentane from Boscan crude oil. There was no rejection observed with this membrane for propane/dewaxed oil. The polyimide membranes had the best overall performance. There were two types of polyimide membranes tested which differed by the supplier of the polymer. The membrane of polyimide supplied by Lenzing was evaluated using dewaxed Bright Stock oil compared with 600N dewaxed oil for the other membranes. As a consequence, the Lenzing polyimide membrane exhibited a lower permeation rate.

TABLE 1

MEMBRANES PROPANE/OIL REVERSE OSMOSIS PERFORMANCE
Feed = 8 LV % 600 N dewaxed oil in propane
Temperature = 60° C.

|  | ΔP psig | Permeation Rate l/m² Day | Oil Rejection % |
|---|---|---|---|
| Commercial Membranes: (a) | | | |
| PC (0.015 μm) | 100 | 44 k | 17 |
| PSF (0.07 μm) | 600 | 90 k | ~0 |
| CA (0% S.R.) | 100 | 15 k | 14 |
| CA (50% S.R.) | 600 | 17 | (b) |
| CA (0% S.R.) annealed* | 100 | 1000 | 69 |
| PBI (0% S.R.) | 100 | 155 | 3 |
| PBI (50% S.R.) | 600 | 20 | 80 |
| PBI (0% S.R.) annealed | 600 | 40 | 100 |
| Laboratory Prepared Membranes: | | | |
| Polyethersulfone | 100 | 6950 | ~0 |
| Polyvinylidene Fluoride | 600 | 37.5 k | ~0 |
| Polyimide, UpJohn (c) | 600 | 3950 | 67 |
| Polyimide, Lenzing (d) (e) | 600 | 1100 | 67 |

Notes:
(a) Pore size or salt rejection capability (% S.R.) shown in parenthesis.
(b) Permeate sample too small to analyze for oil rejection.
(c) Polyimide polymer supplied by UpJohn.
(d) Polyimide polymer supplied by Lenzing.
(e) Tested using Bright Stock oil which was dewaxed.
Definitions:
PC polycarbonate (Nuclepore)
PSF polysulfone (DSI)
CA cellulose acetate (Osmonics)
PBI polybenzimidazole (Osmonics)
PAN polyacrylonitrile (Sumitomo)
*% S.R. is an unsatisfactory means for determining pore size or predicting membrane performance. The data for annealed CA (0% S.R.) has not been reproduced. This is probably attributable to differences in pore size between different samples not discoverable relying on % S.R. as a measurement tool.

EXAMPLE 3

The following example is to compare the performance of a polyimide membrane for ketone/oil separation versus for propane/oil separation. The data for ketone/oil were extracted from U.S. Pat. No. 4,532,041. The membranes were made from Upjohn polyimide as opposed to the Lenzing polymer used in the previous examples.

|  | Results: | |
|---|---|---|
|  | Ketone/Oil | Propane/Oil |
| Conditions: | | |
| Feed | 25 wt % 150 N | 20 wt % 600 N |
| Temperature | 23° C. | 60° C. |
| Transmembrane Pressure | 400 psi | 600 psi |
| Membrane: | | |
| Polyimide (wt %) | 20 | 20 |
| Dioxane/DMF (v/v) | 5:1 | 4:1 |
| Performance: | | |
| % Oil Rejection | 97 | 77 |
| Permeation Rate, l/m² day | 667 | 85 |

The difference in the membrane compositions was slight and should not have affected the comparison. However, the difference in the test conditions could have had the effect of enhancing the propane/oil results. Despite this possible effect the overall membrane performance was superior in the ketone/oil application.

EXAMPLE 4

The feasibility of propane recovery from dewaxed oil at the low dewaxing temperature (−10° to −20° C.) is illustrated in this example. The polyimide membrane which was used was made of polymer supplied by Lenzing. The membrane preparation method was as described in Example 1, except for the casting dope composition which consisted of 20 wt % polymer in a 1:1 (v/v) dioxane/DMF solvent mixture.

The test was using a feed with 20 LV % of dewaxed Bright Stock oil in propane. The operating pressure was 950 and 350 psig respectively on the feed and permeate sides giving an apparent pressure differential of 600 psi.

| | Results: | |
|---|---|---|
| Temperature °C. | % Oil Rejection | Permeation Rate l/m² Day |
| −10 | 79 | 1400 |
| −20 | 73 | 720 |

EXAMPLE 5

The following example is to show the effect of the feed operating temperature on the membrane performance. The polyimide membrane that was used was made following the same preparation procedure as for Example 1; except that it used polymer supplied by Upjohn instead of Lenzing.

The test employed a feed with 20 LV % of 600N dewaxed oil in propane. The operating pressure was 950 and 350 psig respectively on the feed and permeate sides. The membrane was tested at three operating temperatures: 60°, 9° and −10° C. The results showed an improvement in % oil rejection at the lower temperatures. There was a corresponding decrease in permeation rate.

| | Results: | |
|---|---|---|
| Temperature °C. | % Oil Rejection | Permeation Rate l/m² Day |
| 60 | 42 | 6040 |
| 9 | 66 | 2625 |
| −10 | 75 | 1300 |

What is claimed is:

1. A method for recovering solvents selected from the group consisting of $C_3$, $C_4$, $C_5$ and $C_6$ aliphatic hydrocarbons and mixtures thereof from oil, said method comprising contacting the solvent containing oil with one side of a reverse osmosis membrane under reverse osmosis conditions and a temperature between about 20° C. and the cloud point of the oil feed to thereby selectively permeate the solvent through the membrane, and recovering the solvent as permeate for reuse.

2. The method of claim 1 wherein the solvent is selected from the group consisting of $C_3$ and $C_4$ hydrocarbons and mixtures thereof.

3. The method of claim 2 wherein the solvent is selected from propane and butane and mixtures thereof.

4. The method of claim 1, 2 or 3 wherein the reverse osmosis process is conducted at a temperature of between about −10° C. and the cloud point of the oil feed.

5. The method of claim 1, 2 or 3 wherein the reverse osmosis process is practiced at an apparent pressure differential of between about 50 to 1500 psi.

6. The method of claim 1, 2 or 3 wherein the reverse osmosis membrane is polyimide.

7. The method of claim 6 wherein the polyimide reverse osmosis membrane has a pore size in the range 0.0001 to 0.00 μm.

8. The method of claim 4 wherein the polyimide reverse osmosis membrane is asymmetric polyimide.

9. The method of claim 4 wherein the reverse osmosis membrane is asymmetric polyimide and has a pore size in the range 0.0001 to 0.001 μm.

* * * * *